United States Patent
Lin et al.

(10) Patent No.: US 10,768,758 B2
(45) Date of Patent: Sep. 8, 2020

(54) TOUCH DISPLAY PANEL

(71) Applicant: Au Optronics Corporation, Hsinchu (TW)

(72) Inventors: Wei-Lin Lin, Hsinchu (TW); Yu-Feng Chien, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 128 days.

(21) Appl. No.: 16/134,998

(22) Filed: Sep. 19, 2018

(65) Prior Publication Data

US 2019/0377437 A1 Dec. 12, 2019

(30) Foreign Application Priority Data

Jun. 12, 2018 (TW) .............................. 107120237 A

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0412* (2013.01); *G06F 3/04886* (2013.01)

(58) Field of Classification Search
CPC ... G06F 3/041–04897; G06F 2203/041–04809
(Continued)

(56) References Cited

U.S. PATENT DOCUMENTS

2013/0106765 A1* 5/2013 Beecher ................. G06F 3/044
345/174

2013/0241857 A1* 9/2013 Chung .................... G06F 3/044
345/173
(Continued)

FOREIGN PATENT DOCUMENTS

CN 101989158 3/2011
CN 104317469 1/2015
(Continued)

*Primary Examiner* — Amr A Awad
*Assistant Examiner* — Aaron Midkiff
(74) *Attorney, Agent, or Firm* — JCIPRNET

(57) ABSTRACT

A touch display panel including a display panel and a touch electrode layer is provided. The display panel has a display region and a peripheral region. The touch electrode layer includes a non-edge unit region and an edge unit region, wherein the vertical projection of the non-edge unit region is completely located within the vertical projection of the display region, the vertical projection of the edge unit region overlaps the vertical projections of the display region and the peripheral region, and the size of the edge unit region is greater than the size of the non-edge unit region. The touch electrode layer includes a first electrode series and a second electrode series extending in different directions. The area of the first electrode series disposed within the non-edge unit region is A1, the area of the first electrode series disposed within the edge unit region is A1', and $(|A1-A1'|)/A1 \le 10\%$. The area of the second electrode series disposed within the non-edge unit region is A2, the area of the second electrode series disposed within the edge unit region is A2', and $(|A2-A2'|)/A2 \le 10\%$. A capacitance value between the first and second electrode series disposed within the non-edge unit region is C1, a capacitance value between the first and second electrode series disposed within the edge unit region is C1', and $(|C1-C1'|) \le 10\%$.

8 Claims, 3 Drawing Sheets

(58) Field of Classification Search
USPC .............................. 178/18.06; 345/173, 174
See application file for complete search history.

(56) References Cited

U.S. PATENT DOCUMENTS

| | | | |
|---|---|---|---|
| 2014/0043244 A1* | 2/2014 | van Lieshout | G06F 1/1643 |
| | | | 345/173 |
| 2016/0291781 A1* | 10/2016 | He | G06F 3/0416 |
| 2017/0090622 A1* | 3/2017 | Badaye | G06F 3/044 |
| 2018/0240850 A1* | 8/2018 | Chen | H01L 27/323 |
| 2019/0204974 A1* | 7/2019 | Gong | G06F 3/0446 |
| 2019/0361551 A1* | 11/2019 | Lius | G06F 3/0412 |

FOREIGN PATENT DOCUMENTS

| | | |
|---|---|---|
| CN | 107085481 | 8/2017 |
| TW | M349001 | 1/2009 |

\* cited by examiner

TOUCH DISPLAY PANEL

CROSS-REFERENCE TO RELATED APPLICATION

This application claims the priority benefit of Taiwan application serial no. 107120237, filed on Jun. 12, 2018. The entirety of the above-mentioned patent application is hereby incorporated by reference herein and made a part of this specification.

BACKGROUND

Technical Field

The disclosure relates to a touch display panel, particularly to a capacitive touch display panel.

Related Art

In the modern information society, people's reliance on electronic products is increasing day by day. To achieve more convenience, more compact volume and more user-friendly designs, touch panels have been introduced to replace conventional keyboards or mice to serve as input devices of many information products. Among them, touch display panels having both touch and display functions have become one of the most popular products at present.

Based on different sensing manners, touch panels are generally classified into resistive touch panels, capacitive touch panels, optical touch panels, acoustic wave touch panels and electromagnetic touch panels. The capacitive touch panels are characterized by short response time, good reliability, high durability and so on, and are therefore widely used in the electronic products. According to an arrangement relationship between a touch panel and a display panel, capacitive touch display panels are also generally classified into three types, i.e., out-cell, on-cell and in-cell.

In the existing designs of the out-cell and on-cell capacitive touch display panels, to avoid optical problems due to overlap of the touch panel and the display panel, for example, a "mura" phenomenon or a moiré visual effect occurring in a display screen, a slim border is unlikely to be achieved. Therefore, there is still a need to improve design flexibility of the capacitive touch display panels to provide the industry with more choices.

SUMMARY

The disclosure provides a touch display panel improved in design flexibility.

A touch display panel according to one embodiment of the disclosure includes a display panel and a touch electrode layer. The display panel has a display region and a peripheral region, wherein the peripheral region surrounds the display region. The touch electrode layer includes a plurality of non-edge unit regions and a plurality of edge unit regions. On a vertical projection plane, the vertical projection of each non-edge unit region is completely located within the vertical projection of the display region, the vertical projection of each edge unit region overlaps the vertical projection of the display region and the vertical projection of the peripheral region, and the size of each edge unit region is greater than the size of each non-edge unit region. The touch electrode layer includes a plurality of first electrode series and a plurality of second electrode series. The first electrode series extend along a first direction. The second electrode series extend along a second direction. The first direction intersects the second direction. The area of the first electrode series correspondingly disposed within each non-edge unit region is A1, the area of the first electrode series correspondingly disposed within each edge unit region is A1', and (|A1−A1'|)/A1≤10%. The area of the second electrode series correspondingly disposed within each non-edge unit region is A2, the area of the second electrode series correspondingly disposed within each edge unit region is A2', and (|A2−A2'|)/A2≤10%. A capacitance value between the first electrode series and the second electrode series correspondingly disposed within each non-edge unit region is C1, a capacitance value between the first electrode series and the second electrode series correspondingly disposed within each edge unit region is C1', and (|C1−C1'|)/C1≤10%.

Based on the above, in the touch display panel according to one embodiment of the disclosure, the area A1 of the first electrode series correspondingly disposed within each non-edge unit region, the area A1' of the first electrode series correspondingly disposed within each edge unit region, the area A2 of the second electrode series correspondingly disposed within each non-edge unit region, the area A2' of the second electrode series correspondingly disposed within each edge unit region, the capacitance value C1 between the first electrode series and the second electrode series correspondingly disposed within each non-edge unit region, as well as the capacitance value C1' between the first electrode series and the second electrode series correspondingly disposed within each edge unit region satisfy the following relations: (|A1−A1'|)/A1≤10%, (|A2−A2'|)/A2≤10%, and (|C1−C1'|)/C1≤10%, wherein, on a vertical projection plane, the vertical projection of each non-edge unit region is completely located within the vertical projection of the display region, the vertical projection of each edge unit region overlaps the vertical projection of the display region and the vertical projection of the peripheral region surrounding the display region, and the size of each edge unit region is greater than the size of each non-edge unit region. Thereby, design flexibility of the touch display panel can be increased.

To make the above features and advantages of the disclosure more comprehensible, several embodiments accompanied with drawings are described in detail as follows.

DESCRIPTION OF THE EMBODIMENTS

Figure 1:
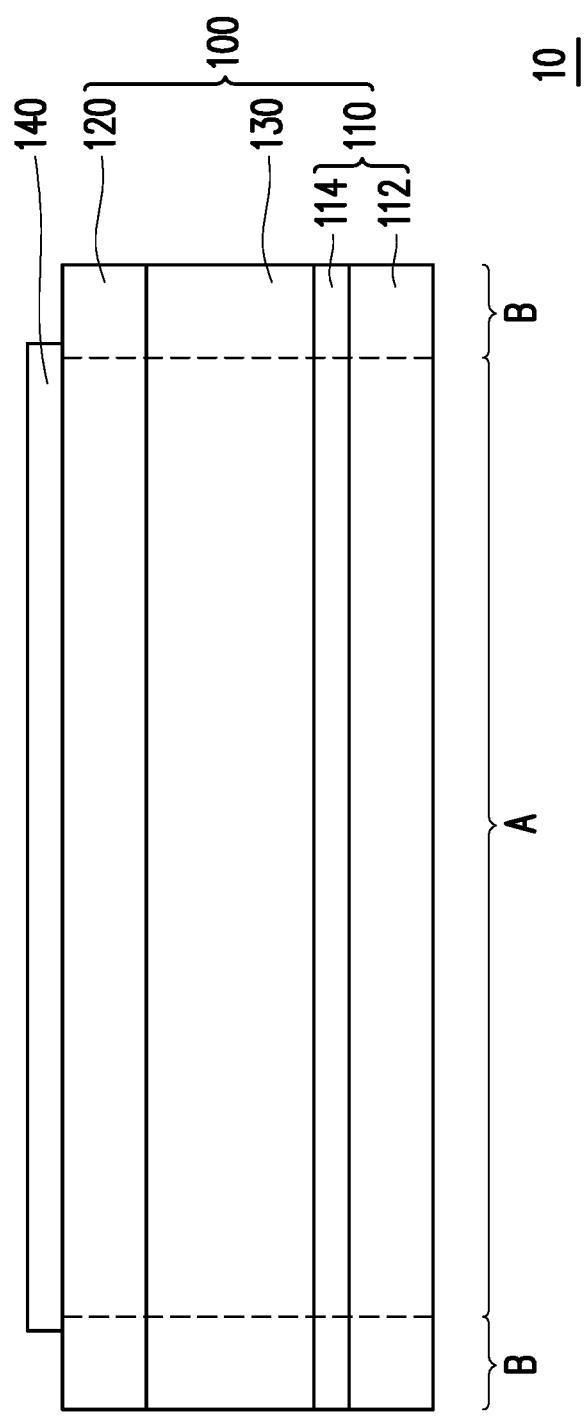
FIG. 1 is a schematic side view of a touch display panel according to one embodiment of the disclosure.
Figure 2:
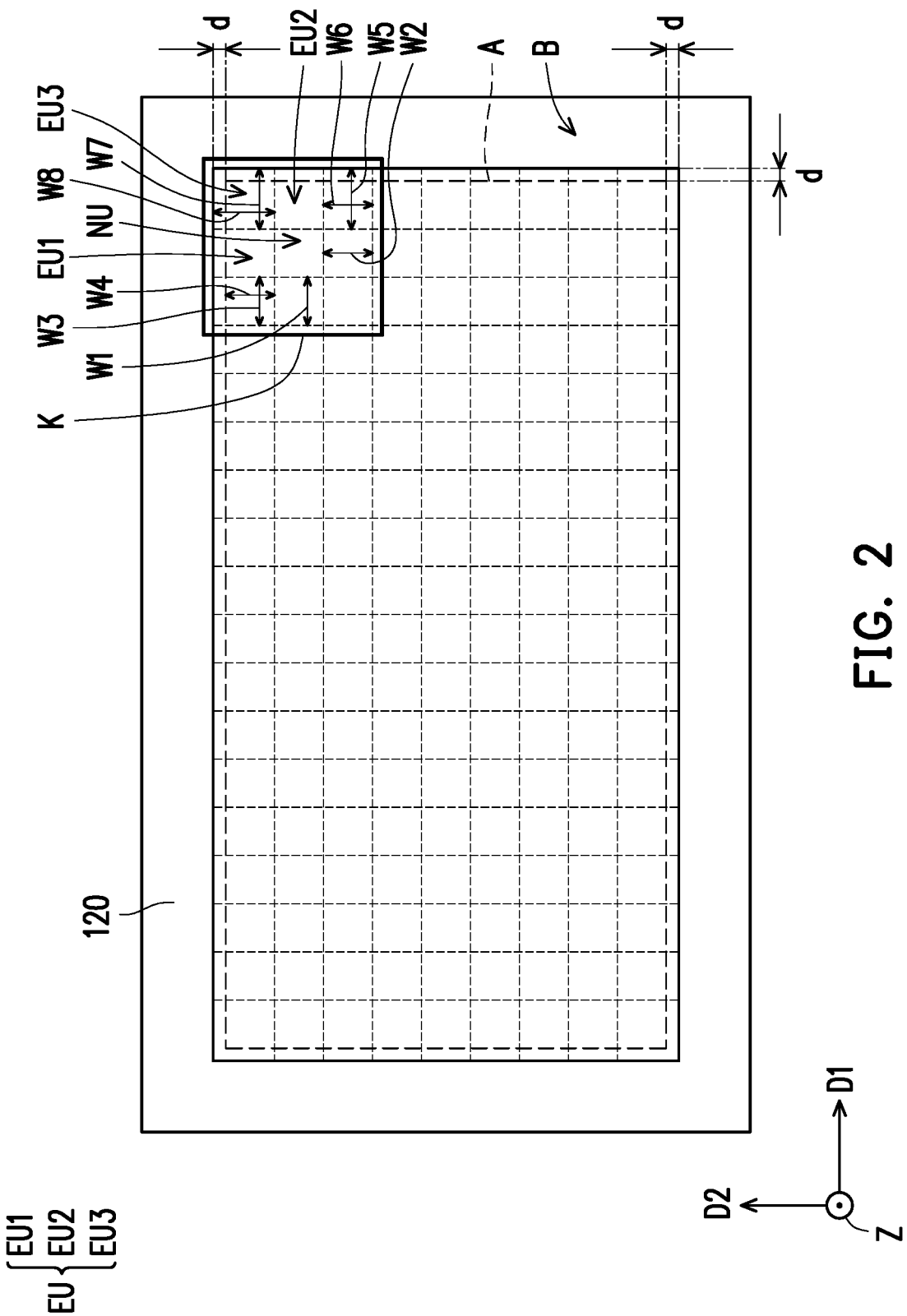
FIG. 2 is a schematic top view of the touch display panel in FIG. 1.
Figure 3:
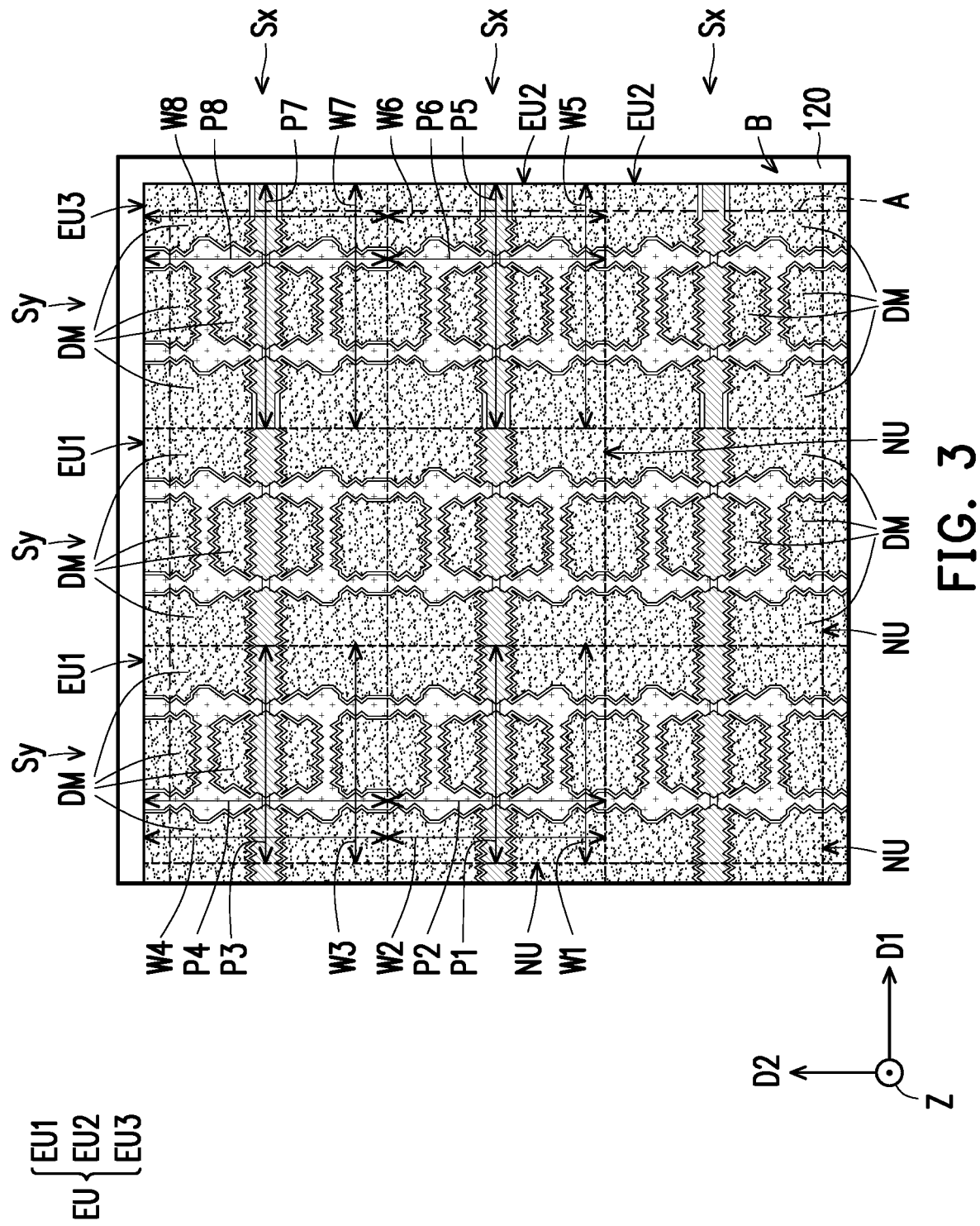
FIG. 3 is a schematic enlarged top view of a region K in FIG. 2

FIG. 1 is a schematic side view of a touch display panel according to one embodiment of the disclosure. FIG. 2 is a schematic top view of the touch display panel in FIG. 1. FIG. 3 is a schematic enlarged top view of a region K in FIG. 2

Referring to FIG. 1 to FIG. 3 together, a touch display panel 10 includes a display panel 100 and a touch electrode layer 140. In the present embodiment, the touch electrode layer 140 is located on the display panel 100. In the present embodiment, the touch electrode layer 140 directly contacts the display panel 100. For example, in the present embodiment, the touch display panel 10 may be an on-cell touch display panel. However, the disclosure is not limited thereto. In other embodiments, the touch display panel 10 may be an out-cell touch display panel. When the touch display panel 10 is an out-cell touch display panel, the touch electrode layer 140 adheres in the form of a complete and independent touch module to the display panel 100. In other embodiments, the touch display panel 10 may be an in-cell touch display panel. An electrode in the display panel 100, for example, is also used the touch electrode layer 140.

In the present embodiment, the display panel 100 has a display region A and a peripheral region B, wherein the peripheral region B surrounds the display region A. In the present embodiment, the display panel 100 may include a pixel array substrate 110, an opposite substrate 120 and a display medium 130. The display region A is, for example, a region of the display panel 100 where a plurality of pixel units (not illustrated) for displaying an image are disposed; the peripheral region B is, for example, a region where none of the above pixel units is disposed. In the present embodiment, the pixel array substrate 110 may include a substrate 112, and a device layer 114 disposed on the substrate 112. The material of the substrate 112 includes, for example, glass, quartz, an organic polymer, metal or other suitable material. The device layer 114 is, for example, an active device array layer including a plurality of pixel units, and may include, for example, a plurality of scan lines, a plurality of data lines, a plurality of transistors, a plurality of electrodes, a plurality of capacitors and at least one insulating layer. However, the disclosure is not limited thereto and can be adjusted and varied as needed.

The opposite substrate 120 and the pixel array substrate 110 are disposed opposite each other. In the present embodiment, the opposite substrate 120 may include a blank substrate and a device layer located on the blank substrate. In one embodiment, the material of the blank substrate includes, for example, glass, quartz, an organic polymer, metal or other suitable material. In one embodiment, the device layer included in the opposite substrate 120 may include, for example, a color filter layer, a wavelength conversion layer, a light shielding layer, an opposite electrode layer, or a combination thereof. However, the disclosure is not limited thereto and can be adjusted and varied as needed.

The display medium 130 is located between the pixel array substrate 110 and the opposite substrate 120. In the present embodiment, the display medium 130 may be a liquid crystal material. In other words, the touch display panel 10 may be a touch liquid crystal display panel. However, the disclosure is not limited thereto. In other embodiments, the display medium 130 may be other display material, for example, an organic light emitting diode material, an inorganic light emitting diode material, an electrophoretic display material or a plasma display material. Accordingly, the touch display panel 10 may be a touch organic light emitting diode display panel, a touch inorganic light emitting diode display panel, a touch electrophoretic display panel or a touch plasma display panel.

Referring to FIG. 2 and FIG. 3 together, in the present embodiment, the touch electrode layer 140 includes a plurality of non-edge unit regions NU and a plurality of edge unit regions EU. In the present embodiment, the edge unit regions EU are disposed to surround the non-edge unit regions NU arranged in array, as shown in FIG. 2. For example, the edge unit regions EU are arranged along a first direction D1 in opposite aligned positions and arranged along a second direction D2 in opposite aligned positions, thereby forming a ring shape, but the invention is not limited thereto. In other embodiments, the edge unit regions EU are arranged with forming a non-closed ring to not completely surround the non-edge unit regions NU. In the present embodiment, on a vertical projection plane perpendicular to the normal direction Z of the opposite substrate 120, the vertical projection of each non-edge unit region NU is completely located within the vertical projection of the display region A. That is, on the vertical projection plane, the vertical projection of each non-edge unit region NU completely overlaps the vertical projection of the display region A, but does not overlap the vertical projection of the peripheral region B at all.

In the present embodiment, on the vertical projection plane perpendicular to the normal direction Z of the opposite substrate 120, the vertical projection of each edge unit region EU overlaps the vertical projection of the display region A and the vertical projection of the peripheral region B. That is, in the present embodiment, on the vertical projection plane, the vertical projection area of the touch electrode layer 140 is greater than the vertical projection area of the display region A. For example, in the present embodiment, on the vertical projection plane, a shortest distance d exists between the vertical projection of the display region A and a side of the vertical projection of each edge unit region EU completely located within the vertical projection of the peripheral region B. That is, in the present embodiment, in the first direction D1 intersecting the normal direction Z of the opposite substrate 120 or in the second direction D2 intersecting the normal direction Z of the opposite substrate 120, a portion of the touch electrode layer 140 going beyond the display region A and located within the peripheral region B has a width equal to the shortest distance d, wherein the first direction D1 intersects the second direction D2. In the present embodiment, the shortest distance d is not particularly limited, as long as the touch electrode layer 140 has gone beyond the display region A and is located within the peripheral region B. For example, in one embodiment, the shortest distance d may be about 200 μm to about 1000 μm. In another embodiment, the shortest distance d may be about 200 μm to about 500 μm. In the present embodiment, the shortest distance d extending along the first direction D1 is, for example, equal to the shortest distance d extending along the second direction D2. However, the disclosure is not limited thereto. In other embodiments, the shortest distance d extending along the first direction D1 is, for example, not equal to the shortest distance d extending along the second direction D2.

In the present embodiment, the edge unit regions EU include a plurality of first edge unit regions EU1, a plurality of second edge unit regions EU2 and a plurality of third edge unit regions EU3. The first edge unit regions EU1 are arranged along the first direction D1, and the second edge unit regions EU2 are arranged along the second direction D2. In the present embodiment, the width W3 of each first edge unit region EU in the first direction D1 is the same as the width W1 of each non-edge unit region NU in the first direction D1; the width W4 of each first edge unit region EU1 in the second direction D2 is not the same as the width W2 of each non-edge unit region NU in the second direction D2. For example, in the present embodiment, the width W4 of each first edge unit region EU1 is greater than the width W2 of each non-edge unit region NU. That is, the size of each first edge unit region EU1 is greater than the size of each non-edge unit region NU. In one embodiment, the width W4 of each first edge unit region EU1 may be about 200 μm to about 1000 μm greater than the width W2 of each non-edge unit region NU. In another embodiment, the width W4 of each first edge unit region EU1 may be about 200 μm to about 500 μm greater than the width W2 of each non-edge unit region NU. In addition, in the present embodiment, the width W1 of each non-edge unit region NU may be about 1000 μm to about 6000 μm, and the width W2 of each non-edge unit region NU may be about 1000 μm to about 6000 μm. In the present embodiment, the width W1 and the width W2 of each non-edge unit region NU may be an integer multiple of a width of the aforesaid pixel units in the pixel array substrate 110.

In the present embodiment, the width W5 of each second edge unit region EU2 in the first direction D1 is not the same as the width W1 of each non-edge unit region NU in the first direction D1; the width W6 of each second edge unit region EU2 in the second direction D2 is the same as the width W2 of each non-edge unit region NU in the second direction D2. For example, in the present embodiment, the width W5 of each second edge unit region EU2 is greater than the width W1 of each non-edge unit region NU. That is, the size of each second edge unit region EU2 is greater than the size of each non-edge unit region NU. In one embodiment, the width W5 of each second edge unit region EU2 may be about 200 μm to about 1000 μm greater than the width W1 of each non-edge unit region NU. In another embodiment, the width W5 of each second edge unit region EU2 may be about 200 μm to about 500 μm greater than the width W1 of each non-edge unit region NU.

In the present embodiment, the width W7 of each third edge unit region EU3 in the first direction D1 is not the same as the width W1 of each non-edge unit region NU in the first direction D1; the width W8 of each third edge unit region EU3 in the second direction D2 is not the same as the width W2 of each non-edge unit region NU in the second direction D2. For example, in the present embodiment, the width W7 of each third edge unit region EU3 is greater than the width W1 of each non-edge unit region NU, and the width W8 of each third edge unit region EU3 is greater than the width W2 of each non-edge unit region NU. That is, the size of each third edge unit region EU3 is greater than the size of each non-edge unit region NU. In one embodiment, the width W7 of each third edge unit region EU3 may be about 200 μm to about 1000 μm greater than the width W1 of each non-edge unit region NU, and the width W8 of each third edge unit region EU3 may be about 200 μm to about 1000 μm greater than the width W2 of each non-edge unit region NU. In another embodiment, the width W7 of each third edge unit region EU3 may be about 200 μm to about 500 μm greater than the width W1 of each non-edge unit region NU, and the width W8 of each third edge unit region EU3 may be about 200 μm to about 500 μm greater than the width W2 of each non-edge unit region NU.

In the present embodiment, the width W7 of each third edge unit region EU3 is the same as the width W5 of each second edge unit region EU2, and the width W8 of each third edge unit region EU3 is the same as the width W4 of each first edge unit region EU1. That is, in the present embodiment, the third edge unit region EU3 is adjacent to the first edge unit region EU1 and the second edge unit region EU2.

In the present embodiment, as shown in FIG. 2, on the vertical projection plane perpendicular to the normal direction Z of the opposite substrate 120, the substantially same shortest distance d is provided between the vertical projection of the display region A and a side of the vertical projection of each first edge unit region EU1 completely located within the vertical projection of the peripheral region B, between the vertical projection of the display region A and a side of the vertical projection of each second edge unit region EU2 completely located within the vertical projection of the peripheral region B, and between the vertical projection of the display region A and a side of the vertical projection of each third edge unit region EU3 completely located within the vertical projection of the peripheral region B. However, the disclosure is not limited thereto, and may be achieved as long as the shortest distance d exists between the vertical projection of the display region A and the side of the vertical projection of each edge unit region EU (i.e., each first edge unit region EU1, each second edge unit region EU2 or each third edge unit region EU3) completely located within the vertical projection of the peripheral region B on the vertical projection plane. For example, on the vertical projection plane, the shortest distance d provided between the vertical projection of the display region A and the side of the vertical projection of each first edge unit region EU1 completely located within the vertical projection of the peripheral region B may not be the same as the shortest distance d provided between the vertical projection of the display region A and the side of the vertical projection of each second edge unit region EU2 completely located within the vertical projection of the peripheral region B.

The non-edge unit region NU, the first edge unit region EU and the second edge unit region EU2 have, for example, a rectangular shape. In the present embodiment, as shown in FIG. 2, the non-edge unit region NU has a square shape, the first edge unit region EU1 has a rectangular shape, the second edge unit region EU2 has a rectangular shape, and the third edge unit region EU3 has a square shape. However, the disclosure is not limited thereto. In one embodiment, in the case where the non-edge unit region NU has a square shape, the first edge unit region EU1 has a rectangular shape, and the second edge unit region EU2 has a rectangular shape, the third edge unit region EU3 may have a rectangular shape. In another embodiment, in the case where the first edge unit region EU1 has a rectangular shape, the second edge unit region EU2 has a rectangular shape, and the third edge unit region EU3 has a square shape, the non-edge unit region NU may have a rectangular shape.

Referring again to FIG. 2 and FIG. 3, in the present embodiment, the touch electrode layer 140 includes a plurality of first electrode series Sx extending along the first direction D1 and a plurality of second electrode series Sy extending along the second direction D2. Herein, the so-called electrode series substantially refers to a structure design in which a plurality of electrode patterns for sensing are connected in series. In addition, the first electrode series Sx and the second electrode series Sy are not electrically connected to each other. In the present embodiment, the first electrode series Sx may be used as a signal transmitter series, and the second electrode series Sy may be used as a signal receiver series. In other words, in the present embodiment, the touch display panel 10 may be a mutual-capacitive touch display panel.

In addition, in the present embodiment, the touch electrode layer 140 may selectively further include a plurality of dummy electrodes DM. As shown in FIG. 3, the dummy electrodes DM are correspondingly disposed within the non-edge unit regions NU and the edge unit regions EU (i.e., the first edge unit regions EU1, the second edge unit regions EU2 and the third edge unit regions EU3), so as to substantially fill a region outside the first electrode series Sx and the second electrode series Sy.

In the present embodiment, as shown in FIG. 3, the first electrode series Sx and the second electrode series Sy are respectively correspondingly disposed within the non-edge unit regions NU and the edge unit regions EU (i.e., the first edge unit regions EU1, the second edge unit regions EU2 and the third edge unit regions EU3). That is, in the present embodiment, both the first electrode series Sx and the second electrode series Sy are partially disposed within each non-edge unit region NU, each first edge unit region EU1, each second edge unit region EU2 and each third edge unit region EU3.

As shown in FIG. 3, in the present embodiment, the portions of the first electrode series Sx disposed within each non-edge unit region NU, within each first edge unit region EU1, within each second edge unit region EU2 and within each third edge unit region EU3 each have a symmetrical pattern, and the portions of the second electrode series Sy disposed within each non-edge unit region NU, within each first edge unit region EU1, within each second edge unit region EU2 and within each third edge unit region EU3 each have a symmetrical pattern. In other words, in the present embodiment, the portion of the first electrode series Sx correspondingly disposed within each non-edge unit region NU may be regarded as a minimum repeated pattern of the first electrode series Sx, the portion of the first electrode series Sx within each first edge unit region EU1 may be regarded as another minimum repeated pattern of the first electrode series Sx, the portion of the first electrode series Sx within each second edge unit region EU2 may be regarded as still another minimum repeated pattern of the first electrode series Sx, and the portion of the first electrode series Sx within each third edge unit region EU3 may be regarded as yet still another minimum repeated pattern of the first electrode series Sx, wherein the minimum repeated patterns of the first electrode series Sx respectively located within the non-edge unit regions NU, the first edge unit regions EU1, the second edge unit regions EU2 and the third edge unit regions EU3 are, for example, different from one another. However, the disclosure is not limited thereto. The portion of the second electrode series Sy correspondingly disposed within each non-edge unit region NU may be regarded as a minimum repeated pattern of the second electrode series Sy, the portion of the second electrode series Sy within each first edge unit region EU1 may be regarded as another minimum repeated pattern of the second electrode series Sy, the portion of the second electrode series Sy within each second edge unit region EU2 may be regarded as still another minimum repeated pattern of the second electrode series Sy, and the portion of the second electrode series Sy within each third edge unit region EU3 may be regarded as yet still another minimum repeated pattern of the second electrode series Sy, wherein the minimum repeated patterns of the second electrode series Sy respectively located within the non-edge unit regions NU, the first edge unit regions EU1, the second edge unit regions EU2 and the third edge unit regions EU3 are, for example, different from one another. However, the disclosure is not limited thereto.

As shown in FIG. 3, in the present embodiment, a pitch P1 of the first electrode series Sx correspondingly disposed within the non-edge unit regions NU is the same as the width W1 of each non-edge unit region NU, and a pitch P2 of the second electrode series Sy correspondingly disposed within the non-edge unit regions NU is the same as the width W2 of each non-edge unit region NU. Herein, the so-called pitch of an electrode series substantially refers to the length of a minimum repeated pattern of the electrode series in the extension direction. In another aspect, as shown in FIG. 3, in the present embodiment, the first electrode series Sx correspondingly disposed within the non-edge unit regions NU have the same outline, and the second electrode series Sy correspondingly disposed within the non-edge unit regions NU have the same outline. Based on the above, in the present embodiment, the first electrode series Sx correspondingly disposed within the non-edge unit regions NU have the same pattern, and the second electrode series Sy correspondingly disposed within the non-edge unit regions NU have the same pattern.

As shown in FIG. 3, in the present embodiment, a pitch P3 of the first electrode series Sx correspondingly disposed within the first edge unit regions EU1 is the same as the width W3 of each first edge unit region EU1, and a pitch P4 of the second electrode series Sy correspondingly disposed within the first edge unit regions EU1 is the same as the width W4 of each first edge unit region EU1. That is, in the present embodiment, the pitch P3 of the first electrode series Sx correspondingly disposed within the first edge unit regions EU1 is the same as the pitch P1 of the first electrode series Sx correspondingly disposed within the non-edge unit regions NU, and the pitch P4 of the second electrode series Sy correspondingly disposed within the first edge unit regions EU is not the same as the pitch P2 of the second electrode series Sy correspondingly disposed within the non-edge unit regions NU. In another aspect, as shown in FIG. 3, in the present embodiment, an outline of the first electrode series Sx correspondingly disposed within the first edge unit regions EU1 is the same as the outline of the first electrode series Sx correspondingly disposed within the non-edge unit regions NU, and an outline of the second electrode series Sy correspondingly disposed within the first edge unit regions EU1 is not the same as the outline of the second electrode series Sy correspondingly disposed within the non-edge unit regions NU. Based on the above, in the present embodiment, the pattern of the first electrode series Sx correspondingly disposed within the first edge unit regions EU1 is the same as the pattern of the first electrode series Sx correspondingly disposed within the non-edge unit regions NU; the pattern of the second electrode series Sy correspondingly disposed within the first edge unit regions EU1 is not the same as the pattern of the second electrode series Sy correspondingly disposed within the non-edge unit regions NU.

As shown in FIG. 3, in the present embodiment, a pitch P5 of the first electrode series Sx correspondingly disposed within the second edge unit regions EU2 is the same as the width W5 of each second edge unit region EU2, and a pitch P6 of the second electrode series Sy correspondingly disposed within the second edge unit regions EU2 is the same as the width W6 of each second edge unit region EU2. That is, in the present embodiment, the pitch P5 of the first electrode series Sx correspondingly disposed within the second edge unit regions EU2 is not the same as the pitch P1 of the first electrode series Sx correspondingly disposed within the non-edge unit regions NU, and the pitch P6 of the second electrode series Sy correspondingly disposed within the second edge unit regions EU2 is the same as the pitch P2 of the second electrode series Sy correspondingly disposed within the non-edge unit regions NU. In another aspect, as shown in FIG. 3, in the present embodiment, an outline of the first electrode series Sx correspondingly disposed within the second edge unit regions EU2 is not the same as the outline of the first electrode series Sx correspondingly disposed within the non-edge unit regions NU, and an outline of the second electrode series Sy correspondingly disposed within the second edge unit regions EU2 is the same as the outline of the second electrode series Sy correspondingly disposed within the non-edge unit regions NU. Based on the above, in the present embodiment, the pattern of the first electrode series Sx correspondingly disposed within the second edge unit regions EU2 is not the same as the pattern of the first electrode series Sx correspondingly disposed within the non-edge unit regions NU;

the pattern of the second electrode series Sy correspondingly disposed within the second edge unit regions EU2 is the same as the pattern of the second electrode series Sy correspondingly disposed within the non-edge unit regions NU.

As shown in FIG. 3, in the present embodiment, a pitch P7 of the first electrode series Sx correspondingly disposed within the third edge unit regions EU3 is the same as the width W7 of each third edge unit region EU3, and a pitch P8 of the second electrode series Sy correspondingly disposed within the third edge unit regions EU3 is the same as the width W8 of each third edge unit region EU3. That is, in the present embodiment, the pitch P7 of the first electrode series Sx correspondingly disposed within the third edge unit regions EU3 is not the same as the pitch P1 of the first electrode series Sx correspondingly disposed within the non-edge unit regions NU, and the pitch P8 of the second electrode series Sy correspondingly disposed within the third edge unit regions EU3 is not the same as the pitch P2 of the second electrode series Sy correspondingly disposed within the non-edge unit regions NU. In another aspect, as shown in FIG. 3, in the present embodiment, an outline of the first electrode series Sx correspondingly disposed within the third edge unit regions EU3 is not the same as the outline of the first electrode series Sx correspondingly disposed within the non-edge unit regions NU, and an outline of the second electrode series Sy correspondingly disposed within the third edge unit regions EU3 is not the same as the outline of the second electrode series Sy correspondingly disposed within the non-edge unit regions NU. Based on the above, in the present embodiment, the pattern of the first electrode series Sx correspondingly disposed within the third edge unit regions EU3 is not the same as the pattern of the first electrode series Sx correspondingly disposed within the non-edge unit regions NU; the pattern of the second electrode series Sy correspondingly disposed within the third edge unit regions EU3 is not the same as the pattern of the second electrode series Sy correspondingly disposed within the non-edge unit regions NU.

In the present embodiment, the area of the first electrode series Sx correspondingly disposed within each non-edge unit region NU is A1, and the area of the first electrode series Sx correspondingly disposed within each edge unit region EU (i.e., each first edge unit region EU1, each second edge unit region EU2 or each third edge unit region EU3) is A1', wherein A1 and A1' satisfy the following relation: $(|A1-A1'|)/A1 \leq 10\%$. In the present embodiment, the pattern of the first electrode series Sx correspondingly disposed within the second edge unit regions EU2 is not the same as the pattern of the first electrode series Sx correspondingly disposed within the non-edge unit regions NU, and there is an area difference ratio of 10% or less between the area of the first electrode series Sx correspondingly disposed within the second edge unit regions EU2 and the area of the first electrode series Sx correspondingly disposed within the non-edge unit regions NU. Similarly, the pattern of the first electrode series Sx correspondingly disposed within the third edge unit regions EU3 is not the same as the pattern of the first electrode series Sx correspondingly disposed within the non-edge unit regions NU, and there is an area difference ratio of 10% or less between the area of the first electrode series Sx correspondingly disposed within the third edge unit regions EU3 and the area of the first electrode series Sx correspondingly disposed within the non-edge unit regions NU. However, the disclosure is not limited thereto. In other embodiments, the area $A_{Sx\_EU3}$ of the first electrode series Sx correspondingly disposed within each third edge unit region EU3 and the area $A_{Sx\_NU}$ of the first electrode series Sx correspondingly disposed within each non-edge unit region NU satisfy the following relation: $0 < (A_{Sx\_EU3} - A_{Sx\_NU})/A_{Sx\_NU} \leq 10\%$.

In addition, in the present embodiment, the area of the second electrode series Sy correspondingly disposed within each non-edge unit region NU is A2, and the area of the second electrode series Sy correspondingly disposed within each edge unit region EU (i.e., each first edge unit region EU1, each second edge unit region EU2 or each third edge unit region EU3) is A2', wherein A2 and A2' satisfy the following relation: $(|A2-A2'|)/A2 \leq 10\%$. In the present embodiment, the pattern of the second electrode series Sy correspondingly disposed within the first edge unit regions EU1 is not the same as the pattern of the second electrode series Sy correspondingly disposed within the non-edge unit regions NU, and there is an area difference ratio of 10% or less between the area of the second electrode series Sy correspondingly disposed within the first edge unit regions EU1 and the area of the second electrode series Sy correspondingly disposed within the non-edge unit regions NU. Similarly, the pattern of the second electrode series Sy correspondingly disposed within the third edge unit regions EU3 is not the same as the pattern of the second electrode series Sy correspondingly disposed within the non-edge unit regions NU, and there is an area difference ratio of 10% or less between the area of the second electrode series Sy correspondingly disposed within the third edge unit regions EU3 and the area of the second electrode series Sy correspondingly disposed within the non-edge unit regions NU. However, the disclosure is not limited thereto. In other embodiments, the area $A_{Sy\_EU3}$ of the second electrode series Sy correspondingly disposed within each third edge unit region EU3 and the area $A_{Sy\_NU}$ of the second electrode series Sy correspondingly disposed within each non-edge unit region NU satisfy the following relation: $0 < (A_{Sy\_EU3} - A_{Sy\_N})/A_{Sy\_NU} \leq 10\%$.

Since the area A1, A1', A2, A2', $A_{Sx\_EU3}$, $A_{Sx\_NU}$, $A_{Sy\_EU3}$ and $A_{Sy\_NU}$ satisfy the above-mentioned relations, value of parasitic capacitance formed between the first electrode series Sx correspondingly disposed within each non-edge unit region NU and an electrode (e.g., the opposite electrode layer included in the opposite substrate 120, or the electrode included in the device layer 114 of the pixel array substrate 110) in the display panel 100, value of parasitic capacitance formed between the first electrode series Sx correspondingly disposed within each edge unit region EU and an electrode (e.g., the opposite electrode layer included in the opposite substrate 120, or the electrode included in the device layer 114 of the pixel array substrate 110) in the display panel 100, value of parasitic capacitance formed between the second electrode series Sy correspondingly disposed within each non-edge unit region NU and an electrode (e.g., the opposite electrode layer included in the opposite substrate 120, or the electrode included in the device layer 114 of the pixel array substrate 110) in the display panel 100, and value of parasitic capacitance formed between the second electrode series Sy correspondingly disposed within each edge unit region EU and an electrode (e.g., the opposite electrode layer included in the opposite substrate 120, or the electrode included in the device layer 114 of the pixel array substrate 110) in the display panel 100 are close to each other, such that overall resistance and capacitance become more uniform. In this way, resistive-capacitive delay (RC delay) is unlikely to occur in the touch electrode layer 140, and the touch display panel 10 thus has good sensitivity. In addition, the overall electric field becomes more uniform, and thus a more uniform overall touch effect can be achieved. In another aspect, since the touch electrode layer 140 covers the entire display region A and a portion of the peripheral region B connected to the display region A, and the area A1, A1', A2, A2', $A_{Sx\_EU3}$, $A_{Sx\_NU}$, $A_{Sy\_EU3}$ and $A_{Sy\_NU}$ satisfy the above-mentioned relations, a good touch and sensing effect is provided at edges and corners of the display region A.

In the present embodiment, a capacitance value between the first electrode series Sx and the second electrode series Sy correspondingly disposed within each non-edge unit region NU is C1, and a capacitance value between the first electrode series Sx and the second electrode series Sy correspondingly disposed within each edge unit region EU (i.e., each first edge unit region EU1, each second edge unit region EU2 or each third edge unit region EU3) is C1', wherein C1 and C1' satisfy the following relation: (|C1−C1'|)/C1≤10%. In the present embodiment, the pattern of at least one of the first electrode series Sx and the second electrode series Sy correspondingly disposed within the edge unit regions EU is not the same as the pattern of at least one of the first electrode series Sx and the second electrode series Sy correspondingly disposed within the non-edge unit regions NU, and the dummy electrodes DM are disposed between the first electrode series Sx and the second electrode series Sy correspondingly disposed within both the non-edge unit regions NU and the edge unit regions EU. However, the disclosure is not limited thereto. In other embodiments, a capacitance value $C_{EU3}$ of a mutual capacitance formed between the first electrode series Sx and the second electrode series Sy correspondingly disposed within each third edge unit region EU3 and a capacitance value $C_{NU}$ of a mutual capacitance formed between the first electrode series Sx and the second electrode series Sy correspondingly disposed within the non-edge unit regions NU satisfy the following relation: $0<(C_{EU3}-C_{NU})/C_{NU}\leq 10\%$.

By the above-mentioned relations, the value of the mutual capacitance formed by the touch electrode layer 140 within the non-edge unit regions NU and the edge unit regions EU is close to the value of the parasitic capacitance formed between the touch electrode layer 140 and the electrode in the display panel 100. Thereby, situations such as where a touch event cannot be sensed by or is misidentified by the touch display panel 10 can be avoided, and sensitivity is enhanced.

It is worth noting that, in the touch display panel 10 according to the present embodiment, in the case where the vertical projection of each non-edge unit region NU is completely located within the vertical projection of the display region A on a vertical projection plane, the vertical projection of each edge unit region EU overlaps the vertical projection of the display region A and the vertical projection of the peripheral region B on the vertical projection plane, and the size of each edge unit region EU is greater than the size of each non-edge unit region NU, the area A1 of the first electrode series Sx correspondingly disposed within each non-edge unit region NU, the area A1' of the first electrode series Sx correspondingly disposed within each edge unit region EU, the area A2 of the second electrode series Sy correspondingly disposed within each non-edge unit region NU, the area A2' of the second electrode series Sy correspondingly disposed within each edge unit region EU, the capacitance value C1 between the first electrode series Sx and the second electrode series Sy correspondingly disposed within each non-edge unit region NU, as well as the capacitance value C1' between the first electrode series Sx and the second electrode series Sy correspondingly disposed within each edge unit region EU satisfy the following relations: (|A1−A1'|)/A1≤10%, (|A2−A2'|)/A2≤10%, and (|C1−C1'|)/C1≤10%. In this way, due to the design of the touch display panel 10, the touch electrode layer 140 can achieve good sensitivity without limiting the area and size of the portion of the touch electrode layer 140 going beyond the display region A. Thereby, design flexibility of the touch display panel 10 is increased.

To be specific, as mentioned above, on a vertical projection plane, the shortest distance d between the vertical projection of the display region A and the side of the vertical projection of each edge unit region EU completely located within the vertical projection of the peripheral region B may be between about 200 μm and about 500 μm. Therefore, the touch display panel 10 having good sensitivity is suitable for a slim border design, and design flexibility of the touch display panel 10 is increased.

Hereinafter, to prove that the design of the touch display panel of the disclosure can increase design flexibility by being suitable for a slim border design while preventing optical problems and having good sensitivity, simulation experiments are conducted for verification in the case where the shortest distance d of the touch display panel 10 (see FIG. 1 to FIG. 3) is 500 μm. Please refer to Table 1 below.

TABLE 1

|  | Non-edge unit region NU | First edge unit region EU1 | Second edge unit region EU2 | Third edge unit region EU3 |
| --- | --- | --- | --- | --- |
| Width (μm) in first direction D1 | 4000 | 4000 | 4500 | 4500 |
| Width (μm) in second direction D2 | 4000 | 4500 | 4000 | 4500 |
| Pitch (μm) of first electrode series Sx | 4000 | 4000 | 4500 | 4500 |
| Pitch (μm) of second electrode series Sy | 4000 | 4500 | 4000 | 4500 |
| Area ratio (%) of first electrode series Sx to a unit region where first electrode series Sx are correspondingly disposed | 16.8 | 14.9 | 15.9 | 14.1 |
| Area ratio (%) of second electrode series Sy to a unit region where second electrode series Sy are correspondingly disposed | 20.4 | 19.4 | 18.1 | 17.2 |
| Area ratio (%) of dummy electrodes DM to a unit region where dummy electrodes DM are correspondingly disposed | 61.5 | 64.5 | 64.8 | 67.5 |
| Parasitic capacitance (pF) formed between first electrode series Sx and display panel 100 | 0.86 | 0.86 | 0.94 | 0.95 |
| Parasitic capacitance (pF) formed between second electrode series Sy and display panel 100 | 1.33 | 1.42 | 1.39 | 1.46 |
| Mutual capacitance (pF) formed between first electrode series Sx and second electrode series Sy | 1.47 | 1.45 | 1.45 | 1.44 |

From the simulation results shown in Table 1, it is known that, in the case where the size of each edge unit region EU is greater than the size of each non-edge unit region NU and the shortest distance d is 500 μm, the area A1 of the first electrode series Sx correspondingly disposed within each non-edge unit region NU and the area A1' of the first electrode series Sx correspondingly disposed within each edge unit region EU satisfy the following relation: (|A1−A1'|)/A1≤10%; the area A2 of the second electrode series Sy correspondingly disposed within each non-edge unit region NU and the area A2' of the second electrode series Sy correspondingly disposed within each edge unit region EU satisfy the following relation $(|A2-A2'|)/A2\leq10\%$; and a capacitance value C1 between the first electrode series Sx and the second electrode series Sy correspondingly disposed within each non-edge unit region NU and a capacitance value C1' between the first electrode series Sx and the second electrode series Sy correspondingly disposed within each edge unit region EU satisfy the following relation: $(|C1-C1'|)/C1\leq10\%$.

The results prove the following. In the touch display panel of the disclosure, the first electrode series Sx correspondingly disposed within each non-edge unit region NU, the first electrode series Sx correspondingly disposed within each edge unit region EU, the second electrode series Sy correspondingly disposed within each non-edge unit region NU, the second electrode series Sy correspondingly disposed within each edge unit region EU, the capacitance value C1 between the first electrode series Sx and the second electrode series Sy correspondingly disposed within each non-edge unit region NU, as well as the capacitance value C1' between the first electrode series Sx and the second electrode series Sy correspondingly disposed within each edge unit region EU satisfy the following relations: $(|A1-A1'|)/A1\leq10\%$, $(|A2-A2'|)/A2\leq10\%$, and $(|C1-C1'|)/C1\leq10\%$, wherein the vertical projection of each non-edge unit region NU is completely located within the vertical projection of the display region A on a vertical projection plane, the vertical projection of each edge unit region EU overlaps the vertical projection of the display region A and the vertical projection of the peripheral region B on a vertical projection plane, and the size of each edge unit region EU is greater than the size of each non-edge unit region NU. Thus, the touch display panel having good sensitivity of the disclosure is reliably suitable for a slim border design, such that design flexibility is increased.

In view of the above, according to the above description of the touch display panel 10 in FIG. 1 to FIG. 3 and the above simulation results, any person of ordinary skill in the art should understand that the type or outline of the first electrode series Sx and the second electrode series Sy in the design of the touch display panel of the disclosure are not particularly limited. Those satisfying the following should fall within the scope of the disclosure. The first electrode series Sx and the second electrode series Sy are respectively correspondingly disposed within the non-edge unit regions NU and the edge unit regions EU (i.e., the first edge unit regions EU1, the second edge unit regions EU2 and the third edge unit regions EU3). Moreover, the first electrode series Sx correspondingly disposed within each non-edge unit region NU, the first electrode series Sx correspondingly disposed within each edge unit region EU, the second electrode series Sy correspondingly disposed within each non-edge unit region NU, the second electrode series Sy correspondingly disposed within each edge unit region EU, the capacitance value C1 between the first electrode series Sx and the second electrode series Sy correspondingly disposed within each non-edge unit region NU, as well as the capacitance value C1' between the first electrode series Sx and the second electrode series Sy correspondingly disposed within each edge unit region EU satisfy the following relations: $(|A1-A1'|)/A1\leq10\%$, $(|A2-A2'|)/A2\leq10\%$, and $(|C1-C1'|)/C1\leq10\%$.

For example, FIG. 3 discloses that the electrode patterns in the first electrode series Sx and the second electrode series Sy are non-diamond shaped patterns. However, the disclosure is not limited thereto. In other embodiments, the electrode patterns in the first electrode series Sx and the second electrode series Sy may be diamond shaped patterns.

In addition, FIG. 3 may be applicable to the case where the first electrode series Sx and the second electrode series Sy have a one-transmitter two-receiver (1T2R) architecture. However, the disclosure is not limited thereto. In other embodiments, the first electrode series Sx and the second electrode series Sy may have a one-transmitter one-receiver (1T1R) architecture.

In addition, FIG. 3 discloses that the pattern of the first electrode series Sx correspondingly disposed within the first edge unit regions EU1 is the same as the pattern of the first electrode series Sx correspondingly disposed within the non-edge unit regions NU. However, the disclosure is not limited thereto. In other embodiments, the pattern of the first electrode series Sx correspondingly disposed within the first edge unit regions EU1 is not the same as the pattern of the first electrode series Sx correspondingly disposed within the non-edge unit regions NU. Similarly, FIG. 3 discloses that the pattern of the second electrode series Sy correspondingly disposed within the second edge unit regions EU2 is the same as the pattern of the second electrode series Sy correspondingly disposed within the non-edge unit regions NU. However, the disclosure is not limited thereto. In other embodiments, the pattern of the second electrode series Sy correspondingly disposed within the second edge unit regions EU2 is not the same as the pattern of the second electrode series Sy correspondingly disposed within the non-edge unit regions NU.

In addition, FIG. 3 discloses that the touch electrode layer 140 further includes the dummy electrodes DM substantially filling the region outside the first electrode series Sx and the second electrode series Sy. However, the disclosure is not limited thereto. In other embodiments, the touch electrode layer 140 may include no dummy electrode, as long as the capacitance value C1 between the first electrode series Sx and the second electrode series Sy correspondingly disposed within each non-edge unit region NU and the capacitance value C1' between the first electrode series Sx and the second electrode series Sy correspondingly disposed within each edge unit region EU satisfy the following relation: $(|C1-C1'|)/C1\leq10\%$.

In summary, in the touch display panel according to the above embodiment, the area A1 of the first electrode series correspondingly disposed within each non-edge unit region, the area A1' of the first electrode series correspondingly disposed within each edge unit region, the area A2 of the second electrode series correspondingly disposed within each non-edge unit region, the area A2' of the second electrode series correspondingly disposed within each edge unit region, the capacitance value C1 between the first electrode series and the second electrode series correspondingly disposed within each non-edge unit region, as well as the capacitance value C1' between the first electrode series and the second electrode series correspondingly disposed within each edge unit region satisfy the following relations: $(|A1-A1'|)/A1\leq10\%$, $(|A2-A2'|)/A2\leq10\%$, and $(|C1-C1'|)/C1\leq10\%$, wherein, on a vertical projection plane, the vertical projection of each non-edge unit region is completely located within the vertical projection of the display region, the vertical projection of each edge unit region overlaps the vertical projection of the display region and the vertical projection of the peripheral region surrounding the display region, and the size of each edge unit region is greater than the size of each non-edge unit region. Thereby, design flexibility of the touch display panel can be increased.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A touch display panel, comprising:
   a display panel having a display region and a peripheral region, wherein the peripheral region substantially surrounds the display region; and
   a touch electrode layer having a plurality of non-edge unit regions and a plurality of edge unit regions, wherein, on a vertical projection plane, a vertical projection of each of the non-edge unit regions is completely located within a vertical projection of the display region, a vertical projection of each of the edge unit regions overlaps the vertical projection of the display region and a vertical projection of the peripheral region, and a size of each of the edge unit regions is greater than a size of each of the non-edge unit regions, wherein the touch electrode layer comprises:
      a plurality of first electrode series extending along a first direction; and
      a plurality of second electrode series extending along a second direction, the first direction intersecting the second direction, wherein,
         an area of each of the first electrode series correspondingly disposed within each of the non-edge unit regions is A1, an area of each of the first electrode series correspondingly disposed within each of the edge unit regions is A1', and $(|A1-A1'|)/A1 \leq 10\%$,
         an area of each of the second electrode series correspondingly disposed within each of the non-edge unit regions is A2, an area of each of the second electrode series correspondingly disposed within each of the edge unit regions is A2', and $(|A2-A2'|)/A2 \leq 10\%$, and
         a capacitance value between the first electrode series and the second electrode series correspondingly disposed within each of the non-edge unit regions is C1, a capacitance value between the first electrode series and the second electrode series correspondingly disposed within each of the edge unit regions is C1', and $(|C1-C1'|)/C1 \leq 10\%$ wherein,
   the edge unit regions comprise a plurality of first edge unit regions, a plurality of second edge unit regions and a plurality of third edge unit regions, wherein,
      a width of each of the first edge unit regions in the first direction is the same as a width of each of the non-edge unit regions in the first direction;
      a width of each of the second edge unit regions in the second direction is the same as a width of each of the non-edge unit regions in the second direction;
      a width of each of the third edge unit regions in the first direction is not the same as the width of each of the non-edge unit regions in the first direction; and
      a width of each of the third edge unit regions in the second direction is not the same as the width of each of the non-edge unit regions in the second direction.

2. The touch display panel according to claim 1, wherein, on the vertical projection plane, a shortest distance between the vertical projection of the display region and a side of the vertical projection of each of the edge unit regions completely located within the vertical projection of the peripheral region is 200 μm to 500 μm.

3. The touch display panel according to claim 1, wherein each of the first electrode series correspondingly disposed within the non-edge unit regions has a same first pattern with each other, and each of the second electrode series correspondingly disposed within the non-edge unit regions has a same second pattern with each other, wherein a third pattern of at least one of the first electrode series and the second electrode series correspondingly disposed within the edge unit regions is not the same as at least one of the first pattern and the second pattern.

4. The touch display panel according to claim 1, wherein,
   a pitch of the first electrode series correspondingly disposed within each of the first edge unit regions is the same as the width of the each of the first edge unit regions in the first direction, and
   a pitch of the second electrode series correspondingly disposed within each of the first edge unit regions is the same as a width of the each of the first edge unit regions in the second direction, wherein, a pitch of the first electrode series correspondingly disposed within each of the second edge unit regions is the same as a width of the each of the second edge unit regions in the first direction, and
   a pitch of the second electrode series correspondingly disposed within each of the second edge unit regions is the same as the width of the each of the second edge unit regions in the second direction.

5. The touch display panel according to claim 1, wherein,
   a pitch of the first electrode series correspondingly disposed within each of the third edge unit regions is the same as the width of the each of the third edge unit regions in the first direction, and
   a pitch of the second electrode series correspondingly disposed within each of the third edge unit regions is the same as the width of the each of the third edge unit regions in the second direction.

6. The touch display panel according to claim 1, wherein the each of the non-edge unit regions has a square shape, the each of the first edge unit regions has a rectangular shape, the each of the second edge unit regions has a rectangular shape, and the each of the third edge unit regions has a square shape.

7. The touch display panel according to claim 1, wherein an outline of the second electrode series correspondingly disposed within one of the first edge unit regions is not the same as an outline of the second electrode series correspondingly disposed within one of the non-edge unit regions, wherein an outline of the first electrode series correspondingly disposed within one of the second edge unit regions is not the same as an outline of the first electrode series correspondingly disposed within one of the non-edge unit regions, wherein an outline of the first electrode series correspondingly disposed within one of the third edge unit regions is not the same as the outline of the first electrode series correspondingly disposed within the one of the non-edge unit regions.

8. The touch display panel according to claim 1, wherein an outline of the second electrode series correspondingly disposed within one of the third edge unit regions is not the same as an outline of the second electrode series correspondingly disposed within one of the non-edge unit regions, wherein the touch electrode layer further comprises a plurality of dummy electrodes so as to substantially fill a plurality of regions outside the plurality of first electrode series and the plurality of second electrode series.

* * * * *